(12) United States Patent
Tocher et al.

(10) Patent No.: US 10,904,431 B2
(45) Date of Patent: Jan. 26, 2021

(54) CAMERA CONTROLLER

(71) Applicant: NCTech Ltd, Edinburgh (GB)

(72) Inventors: Neil Tocher, Edinburgh (GB);
Cameron Ure, Edinburgh (GB);
Mansour Ahmadian, Edinburgh (GB)

(73) Assignee: NCTech Ltd, Edinburgh (GB)

( * ) Notice: Subject to any disclaimer, the term of this patent is extended or adjusted under 35 U.S.C. 154(b) by 45 days.

(21) Appl. No.: 15/786,263

(22) Filed: Oct. 17, 2017

(65) Prior Publication Data

US 2018/0109716 A1    Apr. 19, 2018

(30) Foreign Application Priority Data

Oct. 17, 2016    (GB) .................................. 1617588.7

(51) Int. Cl.
| | |
|---|---|
| H04N 5/232 | (2006.01) |
| G01C 21/34 | (2006.01) |
| G01C 21/32 | (2006.01) |
| G01C 11/02 | (2006.01) |
| G03B 21/28 | (2006.01) |
| H04N 1/00 | (2006.01) |
| H04N 7/18 | (2006.01) |
| G01S 5/02 | (2010.01) |

(52) U.S. Cl.
CPC ......... *H04N 5/23238* (2013.01); *G01C 11/02* (2013.01); *G01C 21/32* (2013.01); *G01C 21/3461* (2013.01); *G01C 21/3469* (2013.01); *G03B 21/28* (2013.01); *H04N 1/00129* (2013.01); *H04N 5/23206* (2013.01); *H04N 7/188* (2013.01); *G01S 5/0247* (2013.01)

(58) Field of Classification Search
None
See application file for complete search history.

(56) References Cited

U.S. PATENT DOCUMENTS

| | | |
|---|---|---|
| 5,926,116 A | 7/1999 | Kitano et al. |
| 2002/0145709 A1 | 10/2002 | Shibasaki et al. |
| 2003/0184654 A1 | 10/2003 | Kinjo |

(Continued)

FOREIGN PATENT DOCUMENTS

| | | |
|---|---|---|
| EP | 1117256 A1 | 7/2001 |
| EP | 1998567 A1 | 12/2008 |

(Continued)

OTHER PUBLICATIONS

Great Britain Patent Application No. 1607937.8, Unpublished (filing date May 6, 2016), Neil Tocher (Inventor), NCTech Ltd. (Assignee), 42 pages.

(Continued)

*Primary Examiner* — Heather R Jones
(74) *Attorney, Agent, or Firm* — Alston & Bird LLP

(57) ABSTRACT

A processing system for a camera, such as a panoramic camera, and an associated mobile device, vehicle, computer program product and method of use. The processing system being configured to access a data store that stores priority or value data, the priority or value data indicating respective priorities or values for each of a plurality of roads, locations, regions or areas. The processing system is configured to determine or identify a location and determine the priority or value for the determined or identified location from the priority or value data.

20 Claims, 9 Drawing Sheets

(56) References Cited

U.S. PATENT DOCUMENTS

| | | | |
|---|---|---|---|
| 2008/0162036 A1* | 7/2008 | Breed | G08G 1/161 |
| | | | 701/408 |
| 2011/0075945 A1 | 3/2011 | Yamaji | |
| 2015/0058300 A1 | 2/2015 | Perczynski et al. | |
| 2015/0161807 A1* | 6/2015 | Pack | H04N 5/23229 |
| | | | 345/629 |
| 2016/0117348 A1 | 4/2016 | Reynertson | |
| 2016/0259814 A1 | 9/2016 | Mizoguchi | |

FOREIGN PATENT DOCUMENTS

| | | |
|---|---|---|
| GB | 2550372 A | 11/2017 |
| GB | 2553148 A | 2/2018 |
| WO | WO 2013/050576 A2 | 4/2013 |

OTHER PUBLICATIONS

European Patent Office, Communication Pursuant to Article 94(3) EPC for European Patent Application No. 17196878.7, dated Jul. 3, 2020, (5 pages), Rijswijk, Netherlands.

European Patent Office, Communication Pursuant to Article 94(3) EPC, dated Jul. 3, 2020, (5 pages), Rijswijk, Netherlands.

\* cited by examiner

| Grid Ref | Value Score |
|----------|-------------|
| 123,456  | 10          |
| 472,147  | 2           |
| 812,718  | 6           |

Figure 8

CAMERA CONTROLLER

CROSS-REFERENCE TO RELATED APPLICATIONS

This application claims priority to and the benefit of United Kingdom Application No. 1617588.7, filed Oct. 17, 2016, the entire contents of which as are hereby incorporated by reference in their entirety.

BACKGROUND

Related Field

The present invention relates to a controller or processing system for a camera, an associated system and method of operation. The controller and/or camera are preferably network connected.

Description of Related Art

Panoramic cameras are designed to provide a wide angle view of a scene. The camera can collect multiple component images at different imaging angles and/or positions and then composite the component images together into one or more composite images or 3D model of the surrounding environment. Such panoramic cameras are often used to capture composite panoramic images or 3D models of locations associated with mapping data, such as in the well-known Google® Streetview®. These composite images and 3D model data can be used as visualization data for locations covered by the mapping data. In this way, a user of the mapping data or a service using such data can be presented with a view of a given location, wherein the view is formed from the visualisation data for a given location. The user can pan the viewpoint and move the location of the viewpoint from which the view is presented. Such visualisation data has proven very popular with users and can be very valuable to service providers.

The cameras used to collect such data are mobile and can be mounted on a vehicle such as a car or van or hand held. This can present issues with latency in forwarding the visualisation data, such as one or more single images, composite images and/or 3D model data, to an associated server, e.g. belonging to the mapping service or data provider. Furthermore, the visualization data can often be large, creating bandwidth issues in communicating the visualization data from the camera to the servers on which the visualization data is stored and/or processed, such as those of the mapping service or data provider. Furthermore, there can be less or no visualization data associated with certain areas represented in the mapping data compared to other areas represented in the mapping data. Therefore a more efficient process of collecting the visualization data would be beneficial.

It is an object of at least one embodiment of at least one aspect of the present invention to overcome or mitigate at least one problem with the prior art.

BRIEF SUMMARY

According to a first aspect is a controller or processing system for a camera, such as a panoramic camera, the controller or processing system storing, comprising and/or being configured to access priority or value data, the priority or value data indicating respective priorities or values for each of a plurality of roads, locations, regions or areas. The controller or processing system may be configured to determine or identify a location. The controller or processing system may be configured to determine a road, location, region or area from the priority or value data that is associated with, matches, corresponds to or is closest to the determined or identified location. The controller or processing system may be configured to determine the priority or value for the determined or identified location from the priority or value data, e.g. from the priority or value associated with the associated, matching, corresponding or closest road, location, region or area from the priority or value data.

The camera may be configured to collect visualization data (e.g. images and/or depth or range information of the environment around the camera). The controller or processing system or camera may be configured to determine visualization data, e.g. from the images and/or depth or range information collected by the camera. The visualization data may comprise images collected by the camera, depth or range information collected by the camera, composite images formed from the images and/or depth or range information collected by the camera and/or 3D models formed from the images and/or depth or range information collected by the camera.

The priority or value data may be at least partially or wholly based on or indicative of an extent or degree of coverage of visualization data for the road, location, region or area. The priority or value data may be at least partially or wholly based on or indicative of the date or age of visualization data for the road, location, region or area. The priority or value data may be at least partially or wholly based on or indicative of the quality of visualization data for the road, location, region or area. The priority or value data may be at least partially or wholly based on or indicative of the value (e.g. commercial value) or interest in visualization data for the road, location, region or area. The priority or value data may be based on or indicative of a plurality of factors, which may comprise one or more of those indicated above. The priority or value data may be determined by a third party and/or by a mapping and/or visualization data service provider. The priority or value data may comprise a priority or value score for each road, location, region or area, the priority or value score may be indicative of the priority or value of the associated road, location, region or area.

The controller or processing system may be implemented on, may be, may comprise or may be comprised in a device that is configured for remote or network communications, such as an internet enabled device. The controller or processing system may be implemented on, may be, may comprise or may be comprised in a mobile or portable device, such as a mobile phone, smartphone, PDA, tablet computer, laptop computer, and/or the like. The controller or processing system may be implemented by a program or application, which may run on the mobile or portable device that is configured for remote or network communications.

The location determined or identified by the controller or processing system may comprise a location, e.g. current location, of the camera and/or controller or processing system. The controller or processing system (or the device upon which it is implemented) and/or the camera may comprise or be configured to access a position determination system for determining the location of the camera and/or controller or processing system. The position determination system may comprise a satellite positioning system (such as GPS, GLONASS, and/or Galileo) and/or a cellular phone network triangulation system, a position determination system based on Wi-Fi network location determination, an accelerometer or footstep based location determination system, a compass based system, a system using an accelerometer of a vehicle and/or any other suitable position determination technique known in the art.

The priority or value data may be stored on the controller or processing system (or on the device upon which it is implemented) and/or may be accessible by the controller or processing system from a remote data store or server, e.g. over a communications network, such as an internet based network or other digital data communications network. The remote server or data store may belong to or be operated by or on behalf of the third party and/or by a mapping and/or visualization data service provider.

The controller or processing system (or the device upon which it is implemented) and/or the camera may comprise or be configured to access a communications system, such as a wireless communications system, which may comprise a communications system for communicating over a Wi-Fi, internet or other digital data based communications network. The camera may be connected or connectable to, and/or configured to communicate with, the controller or processing system, e.g. via a wired or wireless connection. The wireless connection may comprise a Wi-Fi, Bluetooth, Zig-Bee or other suitable wireless data connection. The camera may be configured to receive operating commands from the controller or processing system, e.g. to control the camera to collect the visualization data such as images. The controller or processing system may be configured to receive images, or composite images or 3D model data from the camera.

The controller or processing system may be configured to communicate with the remote server or data store using the communications system, e.g. to receive the priority or value data from the remote server or data store and/or to provide visualization data to the data store or remote server.

The controller or processing system may comprise, be configured to communicate with or be configured to operate a display. For example, the display may be a display of a mobile phone, smartphone, tablet, laptop or PDA in which the controller or processing system is implemented. The controller or processing system may be configured to generate and/or cause the display to show a representation of the priority or value data, e.g. a representation of the priority or value of the associated one or more roads, locations, regions or areas. The representation of the priority or value data may be or comprise a map showing priority or value scores for the associated one or more roads, locations, regions or areas. The representation of the priority or value data may be or comprise a table showing priority or value scores for the associated one or more roads, locations, regions or areas. The priority or value scores in the table may be ranked or ordered, e.g. by proximity or by value or priority. The representation of the priority or value data (e.g. the map) may highlight locations, roads or areas of high priority, e.g. above a threshold priority or value score.

The controller or processing system may be configured to determine and/or display a route, e.g. on the display, wherein the route may be based on the priority or value data. The route may be a route from the determined or identified location (e.g. the current location of the camera and/or controller or processing system). The route may maximise or optimise the priority or value of the roads, locations, regions or areas through which the route passes. The route may be the most efficient route, e.g. between destinations or locations such as between the current location and a destination, which may be a user input destination. The route may be the most efficient route for an available time period, e.g. a user input time period. The route or map may highlight or distinguish high priority or value roads, locations, areas or regions, e.g. having a priority or value score above a threshold.

The controller or processing system may be configured to control the camera to operate based on the priority or value data and the determined or identified location (e.g. the current location of the camera and/or controller or processing system). The controller or processing system may control the camera to selectively collect visualization data (e.g. images) and/or vary the rate or amount of visualization data collected based on the priority or value data and the determined or identified location (e.g. the current location of the camera and/or controller or processing system). For example, the controller or processing system may be configured to control the camera to collect visualization data and/or to increase the rate or amount of visualization data collected when the priority or value score associated with the determined or identified location (e.g. the current location of the camera and/or controller or processing system) is higher or higher than a threshold. The controller or processing system may be configured to control the camera to not collect visualization data and/or to decrease the rate or amount of visualization data collected when the priority or value score associated with the determined or identified location (e.g. the current location of the camera and/or controller or processing system) is lower than or below a threshold.

The priority or value data may associate a required priority or value to roads, locations, regions or areas for which visualization data is required, e.g. by the third party and/or mapping or visualization data service provider. The controller or processing system may be configured to control the camera to collect visualization data and/or to increase the rate or amount of collection of, or to switch to a high rate of collection of, visualization data when the priority or value score associated with the determined or identified location (e.g. the current location of the camera and/or controller or processing system) is the required priority or value.

The priority or value data may associate a not-required and/or less-required priority or value to roads, locations, regions or areas for which visualization data is not required and less required respectively. The controller or processing system may be configured to control the camera to respectively not collect visualization data or to decrease the rate or amount of collection of, or to switch to a low rate or amount of collection of, visualization data when the priority or value score associated with the determined or identified location (e.g. the current location of the camera and/or controller or processing system) is the not-required or less-required priority or value respectively.

The controller or processing system may be configured to process collected visualization data (e.g. images), for example to combine or stitch one or more images and/or depth data collected by the camera, to form composite images and/or 3D model data. The controller or processing system may control the camera to selectively process visualization data (e.g. collected images) and/or vary the rate or amount of processing of the visualization data (e.g. collected images) based on the priority or value data and the determined or identified location (e.g. the current location of the camera and/or controller or processing system). For example, the controller or processing system may be configured to selectively perform processing or increase the amount of processing carried out when the priority or value of the present location of the camera and/or controller or processing system is low or below a threshold (and optionally less or no images need collected) than when the priority or value of the present location of the camera and/or controller or processing system is high or above a threshold (and optionally more images need collected). In this way, the use of the processing capacity of the controller or processing unit may be increased or maximised when less resources are required for collecting visualization data and reduced or minimised when more resources are required for collecting visualization data.

Conversely, in an alternative and/or additional arrangement, the controller or processing system may be configured to selectively perform processing or increase the amount of processing carried out when the priority or value of the present location of the camera and/or controller or processing system is high or above a threshold (and optionally images need collected) than when the priority or value of the present location of the camera and/or controller or processing system is low or below a threshold (and optionally less or no images need collected). In this way, the use of the processing capacity of the controller or processing unit may be increased or maximised when it is necessary to process more visualisation data and reduced or minimised when no or less visualization data needs to be processed. This may result in more efficient use of the controller or processor and/or energy savings.

Using the above arrangement, the controller or processing system may determine the level of requirement for visualization data for a given road, location, area or region, e.g. by obtaining this data from a remote server, such as that of a mapping or visualization data service provider. The level of requirement may be reflected in the priority or value data, which cross references a value or priority score with location. The controller or processing system is configured to obtain the location of the camera and compare it to the locations represented in the priority or value data to determine the priority or data score for the camera's location. In this way, the controller or processing system can determine whether or not visualisation data (or more or less visualization data) is required for the present location. It also allows the mapping or visualization data service provider to prioritise collection of visualization data that they most require or is of most value to them, for example for areas for which demand for visualization data is high, or for which no visualization data or only old or incomplete visualisation data or poor quality visualization data is available.

It also allows the controller or processing system to present indications, e.g. a map or table, to the user operating the controller or processing system and/or camera of locations for which visualization data is of high priority or value. The indications, which may comprise a map or table for example, may be customised based on the determined or identified location (e.g. the location of the camera), e.g. the map may be centred on the camera's location or the table may rank the entries by closeness to the location of the camera. In one optimal embodiment, the controller or processing system may guide or plot a route for the user or camera to take that improves or maximises the priority or value score of the locations that the camera can pass through and collect visualization data, thereby resulting in more efficient visualization data collection and increasing the value of the visualization data collected.

In one exemplary and optional embodiment, the camera may be comprises in or mounted on a vehicle, such as a remotely controlled or autonomous or semi-autonomous vehicle, such as a drone, an at least partly self-driving car or other vehicle, a robot and/or the like. The controller or processing system may be a controller or processing system for, or comprised in, the remotely controlled or autonomous or semi-autonomous vehicle.

The camera may comprise any of the cameras described in any of the patent applications PCT/EP2012/069800, GB1607937.8, GB1608667.0, or GB1614580.7, all in the name of the present applicant and the contents of which are all incorporated by reference as if the contents thereof were set out in full in the present application, and/or the controller or processing system may comprise or be comprised in a controller, control unit, processor or processing system as described in any of these documents.

According to a second aspect is a device, such as a mobile or network enabled device, comprising or configured to implement the controller or processing system of the first aspect. The device may be or comprise or be comprised in a mobile phone, smartphone, PDA, tablet computer, laptop computer, and/or the like. The controller or processing system may be implemented by a suitable program or application (app) running on the device. The device may comprise at least one processor, such as a central processing unit (CPU). The device may comprise memory and/or other data storage, which may be implemented on DRAM (dynamic random access memory), SSD (solid state drive), HDD (hard disk drive) or other suitable magnetic, optical and/or electronic memory device. The device may comprise a communications module, e.g. a wireless and/or wired communications module. The communications module may be configured to communicate over a cellular communications network, Wi-Fi, Bluetooth, ZigBee, satellite communications, other internet enabling networks and/or the like.

The device and/or the controller or processing unit may be configured to communicate with the camera and/or the remote server or data store (e.g. of the third party or mapping or visualization data service provider) via the communications module.

The controller or processing unit may comprise or be implemented using the at least one processor, the memory and/or other data storage and/or the communications module of the device.

According to a third aspect is a system comprising a camera and the controller or processing device of the first aspect. The camera may be linked to or in communication with the controller or processing device. The controller or processing device may be comprised in the camera. The system may comprise the device according to the second aspect. The controller or processing device may be comprised in the device of the second aspect.

The system may be, or comprise or be comprised in a vehicle. The vehicle may be a remotely controlled or autonomous or semi-autonomous vehicle, such as a drone, an at least partly self-driving car or other vehicle, a robot and/or the like. The controller or processing system may be comprised in, configured to communicate with and/or be for the remotely controlled or autonomous or semi-autonomous vehicle. The camera may be mounted in or on the vehicle.

According to a fourth aspect is a method of using the controller or processing system of the first aspect, e.g. to control a camera or to display priority or value data or a visualization based thereon. The method may comprise accessing the priority or value data. The method may comprise determining or identifying a location. The method may comprise determining a road, location, region or area from the priority or value data that is associated with, matches, corresponds to or is closest to the determined or identified location. The method may comprise determining the priority or value associated with the associated, matching, corresponding or closest road, location, region or area from the priority or value data in order to determine the priority or value for the determined or identified location.

According to a fifth aspect of the present invention is a computer program product for implementing the method of the fourth aspect, e.g. when installed or provided in a suitable controller or processing apparatus, such as that of the first aspect or a device according to the second aspect.

The features defined above in accordance with any aspect of the present invention or below in relation to any specific embodiment of the invention may be utilised, either alone or in combination with any other defined feature, in any other aspect or embodiment of the invention. Furthermore, the present invention is intended to cover apparatus configured to perform any feature described herein in relation to a method and/or a method of using or producing or manufacturing any apparatus feature described herein.

BRIEF DESCRIPTION OF THE FIGURES

Various aspects of the invention will now be described by way of example only and with reference to the following drawings, of which:

FIG. 8 shows an example of priority or value data in a look-up table.

DETAILED DESCRIPTION OF VARIOUS EMBODIMENTS

Embodiments of the present invention relate to controllers or processing devices for cameras for collecting visualization data for visualizing locations for provision by a mapping or visualization service provider, such as Google® Streetview®. The cameras are generally panoramic cameras that can collect images over 360° and stitch them together to form a composite image and/or 3D model of the environment, which in turn comprise or are used to form the visualization data that can be presented to a user. Examples of suitable cameras are shown in FIGS. 1 to 3 and 6 and described in PCT/EP2012/069800, GB1607937.8, GB1608667.0, or GB1614580.7, all in the name of the present applicant and the contents of which are all incorporated by reference as if the contents thereof were set out in full in the present application. However, the present invention is not limited to these cameras and it will be appreciated that other suitable panoramic cameras can be used. The cameras optionally also incorporate depth or range data collection devices such as laser scanners that collect depth or range data that can help form the images, composited images and/or 3D models that comprise the visualization data.

In embodiments, the controller or processing device is embodied in a network enabled portable device such as a smartphone, tablet or laptop running a suitable app. However, it will be appreciated that this need not be the case, and instead the controller or processing device may be part of the camera or a stand-alone device, or even a controller for a vehicle, drone or autonomous vehicle or the like.

Figure 1:
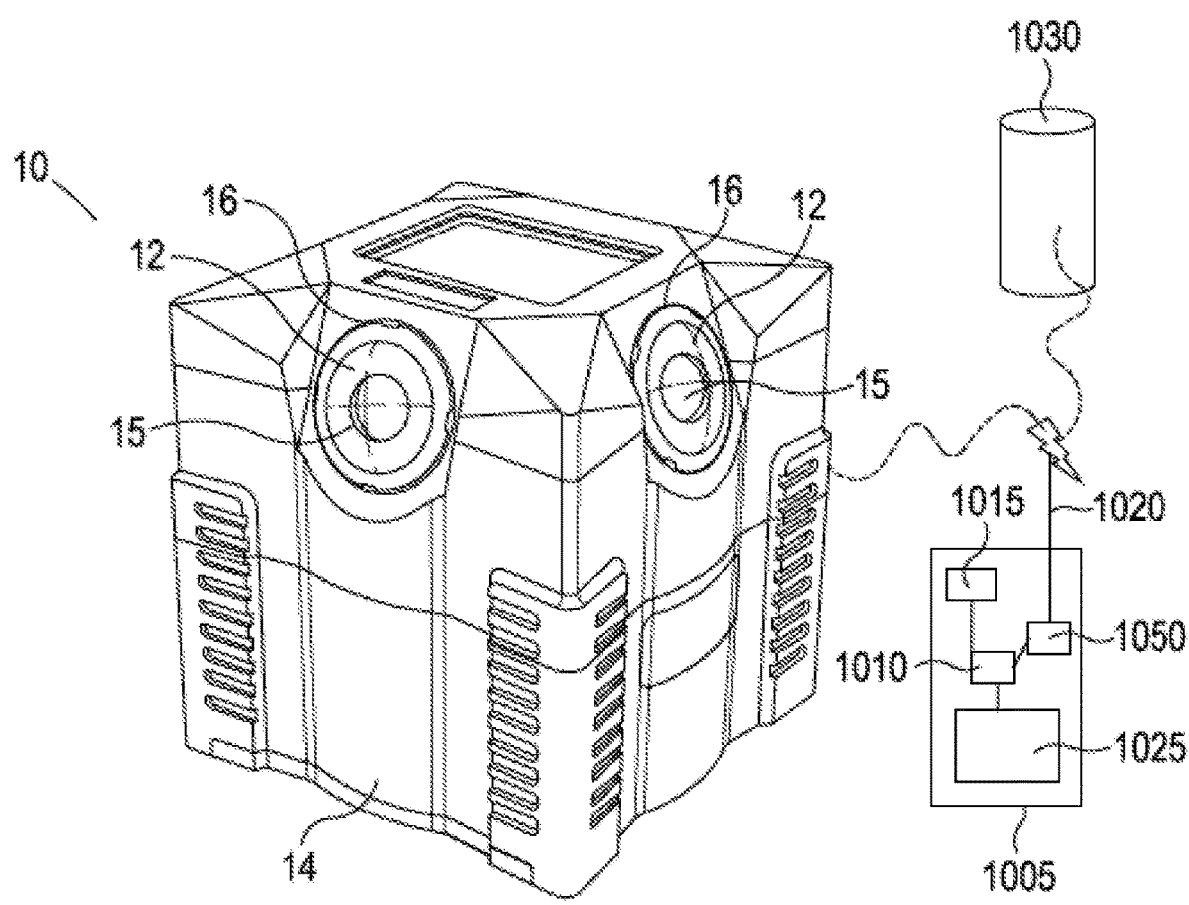
FIG. 1 is schematic view of a system comprising a four lens panoramic camera, a controller and a server.

FIG. 1 shows an example of a camera 10 in communication with the controller 1005. The controller 1005 is a smartphone running a suitable app for example, but need not be, as detailed above. The controller 1005 comprises a processor 1010, a memory 1015, a communications module 1020 for wireless communications and network access and a display 1025. The communications module 1020 is in communication with a processor (not shown) of the camera 10. The communications module 1020 is also in communication with a server 1030 of a visualization data service provider. In this way, the controller 1005 can send operating commands to the camera 10 and receive visualization data (e.g. images and/or depth or range data) collected by the camera 10. The controller 1005 can also send the visualization data collected by the camera and visualization data derived by the controller from the data collected by the camera to the server 1030.

Importantly, the server 1030 stores priority or value data 1035 (see FIG. 8) that contains data indicating priority or value scores 1040 for a series of locations 1045. The locations can be provided as grid references, post codes, addresses or any other suitable form. The locations need not be a single location but could also define areas. The value scores 1040 are determined by the visualization data service provider and can represent or be indicative of a range of appropriate factors such as an extent or degree of coverage of visualization data for the location, the date or age of visualization data for the location (i.e. how long it has been since visualization data was last updated), the quality of visualization data for the location the commercial value or degree of interest in visualization data for the location, and/or the like. However, it will be appreciated that the priority or value scores 1040 are not limited to this.

The controller 1005 is configured to access the priority or value data 1035 from the server 1030 via the communications module 1020. The controller 1005 also comprises a position determination unit 1050 that can determine the location of the controller. Alternatively or additionally, the position determination unit 1050 can be provided in the camera 10, and the location data accessed by the controller 1005 from the camera 10 via the communications module 1020. The position determining unit 1050 may comprise a satellite positioning system (such as GPS, GLONASS, and/or Galileo) and/or a cellular phone network triangulation system, a position determination system based on Wi-Fi network location determination, an accelerometer or footstep based location determination system, a compass based system, a system using an accelerometer of a vehicle and/or any other suitable position determination technique known in the art.

The controller 1005 can then determine the value or priority score 1040 for the current location of the camera 10 and/or controller 1005 by matching or comparing the determined current location from the position determining unit 1050 with the locations in the priority or value data 1035 (or locations closest thereto). The controller 1005 can then control the camera to collect visualization data (e.g. images) depending on the determined priority or value score 1040. For example, a priority or value score 1040 above a threshold may indicated "required" and the controller 1005 may control the camera to collect visualization data. For example, a priority or value score 1040 below a threshold may indicated "not required" and the controller 1005 may control the camera to not collect visualization data. The control may be more nuanced, e.g. wherein the collection rate or quality of visualization data may be varied depending on the priority or value score, with more or higher quality visualization data being collected for higher priority or value score locations (e.g. wherein the priority or value score is above a threshold) and less (or no) or lower quality visualization data being collected for lower priority or value score locations (e.g. wherein the priority or value score is lower than a threshold). The switching between operating states of the camera may be, in certain optimal embodiments, automatic based on the determined priority or value data.

The controller 1005 can process the visualization data (e.g. stitch the images and/or depth or range information together to form composite images or 3D models). The controller 1005 is optionally configured to vary such processing according to the determined priority or value score for the current location. For example, the controller can be configured to preferentially schedule the processing for times when the visualization is not being collected (or the collection rate or quality are reduced).

The controller 1005 is optionally configured to plot or determine a route from the presently determined location of the camera depending on the determined priority or value scores for neighbouring or nearby locations determined from the presently determined location and the priority or value data 1040. This can be achieved by using conventional route planning algorithms adapted to be applied to nearby or neighbouring locations based on the priority or value score. This may comprise using an optimisation algorithm configured to optimise the total or overall priority or value score associated with locations that can be visited in a given (e.g. user selected) time window. The optimisation algorithm could comprise, for example, least squares, monte-carlo, simulated annealing, genetic algorithms and/or the like.

Figure 7:
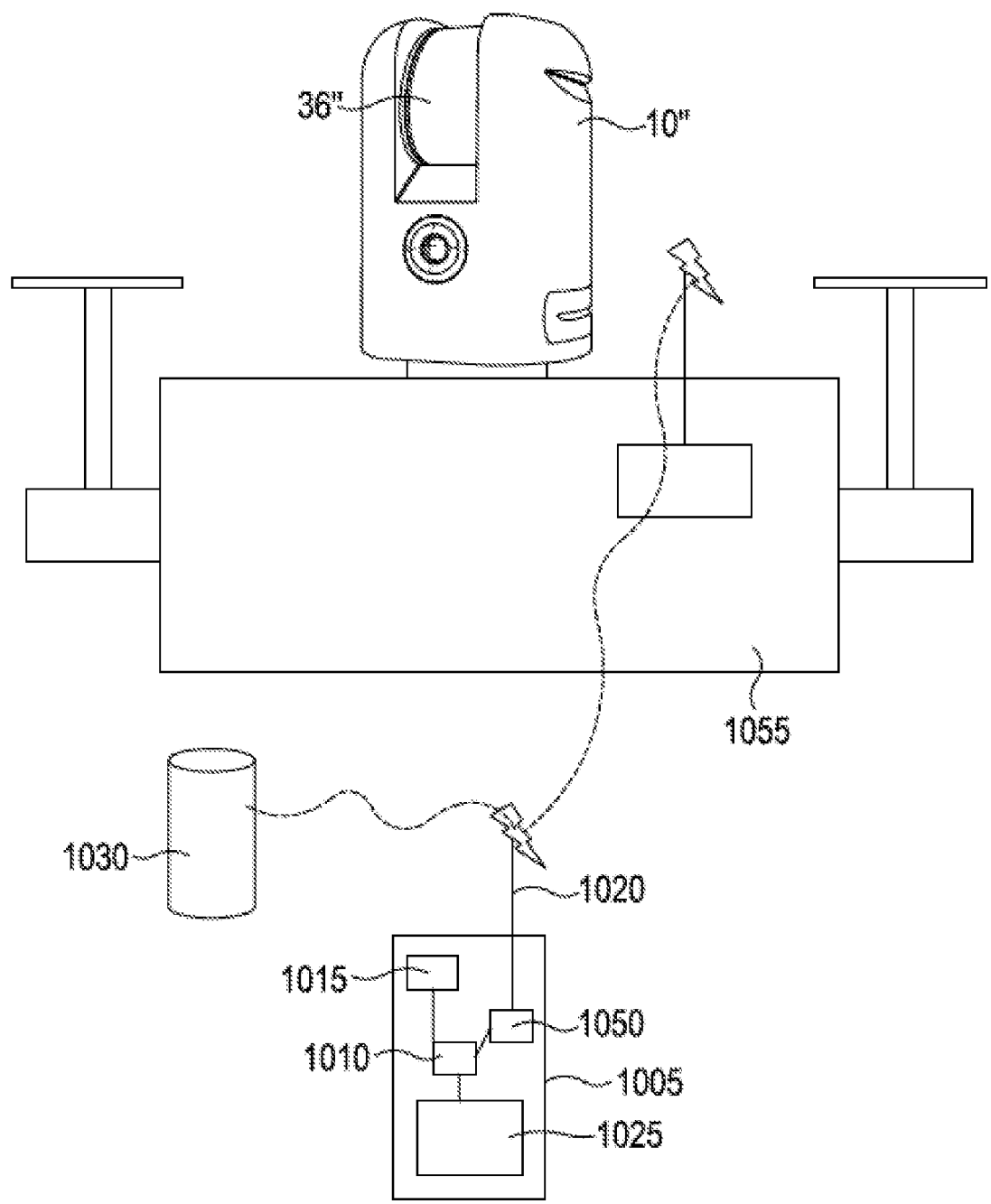
FIG. 7 shows the camera of FIG. 6 mounted on an autonomous vehicle, such as a driverless car or drone.

Optionally, the camera 10 can be comprised in or mounted on a vehicle 1055, such as a remotely controlled or autonomous or semi-autonomous vehicle, such as a drone, an at least partly self-driving car or other vehicle, a robot and/or the like, as shown in FIG. 7. The controller or processing system 1005 in this embodiment can be a controller or processing system for, or comprised in, the remotely controlled or autonomous or semi-autonomous vehicle 1055.

Figure 5:
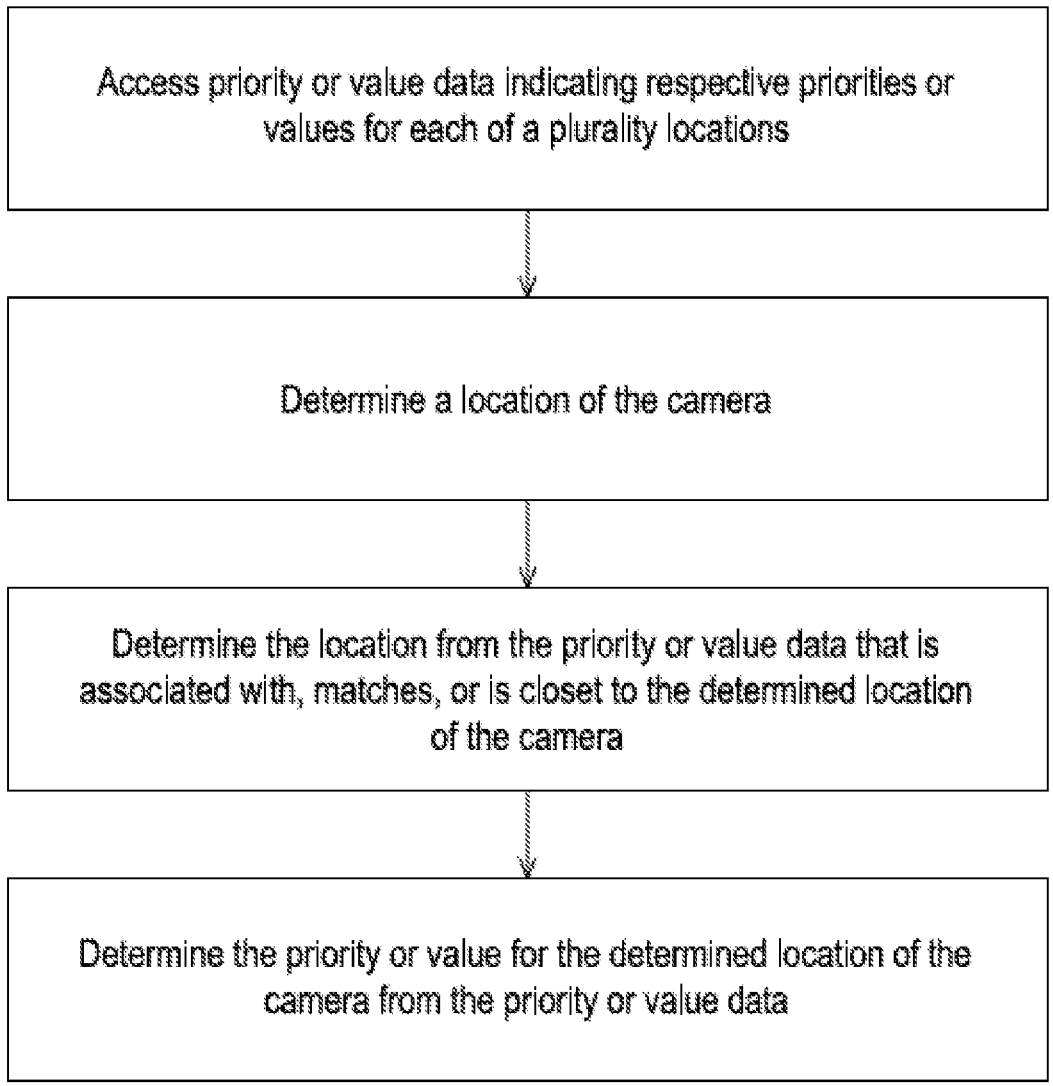
FIG. 5 is a method of stitching component images, such as those taken by the camera of FIG. 1, into a composite image.

The method of operation of the controller 1005 is shown in FIG. 5.

Some non-limiting examples of cameras 10 that could be used are shown in FIGS. 1 to 3 and 6.

Figure 2:
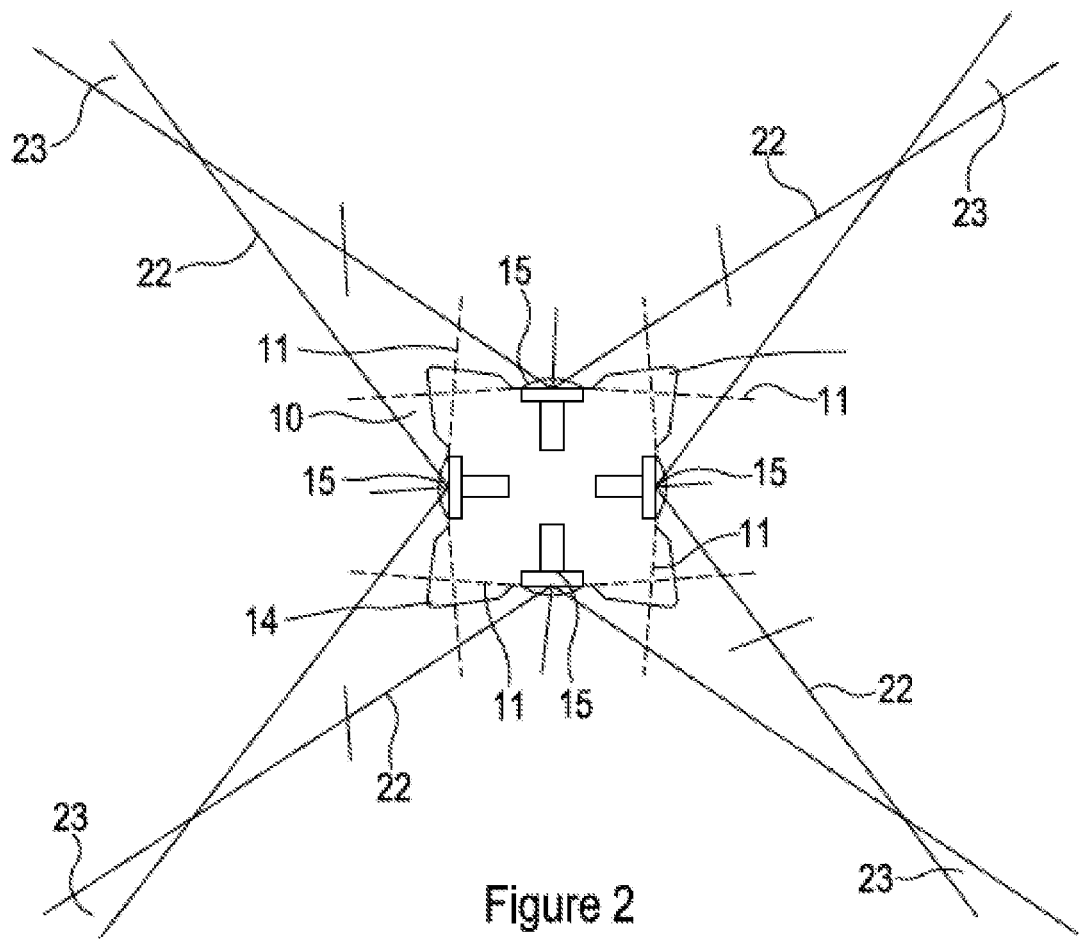
FIG. 2 shows the fields of view for each of the lenses of the camera of FIG. 1.
Figure 3:
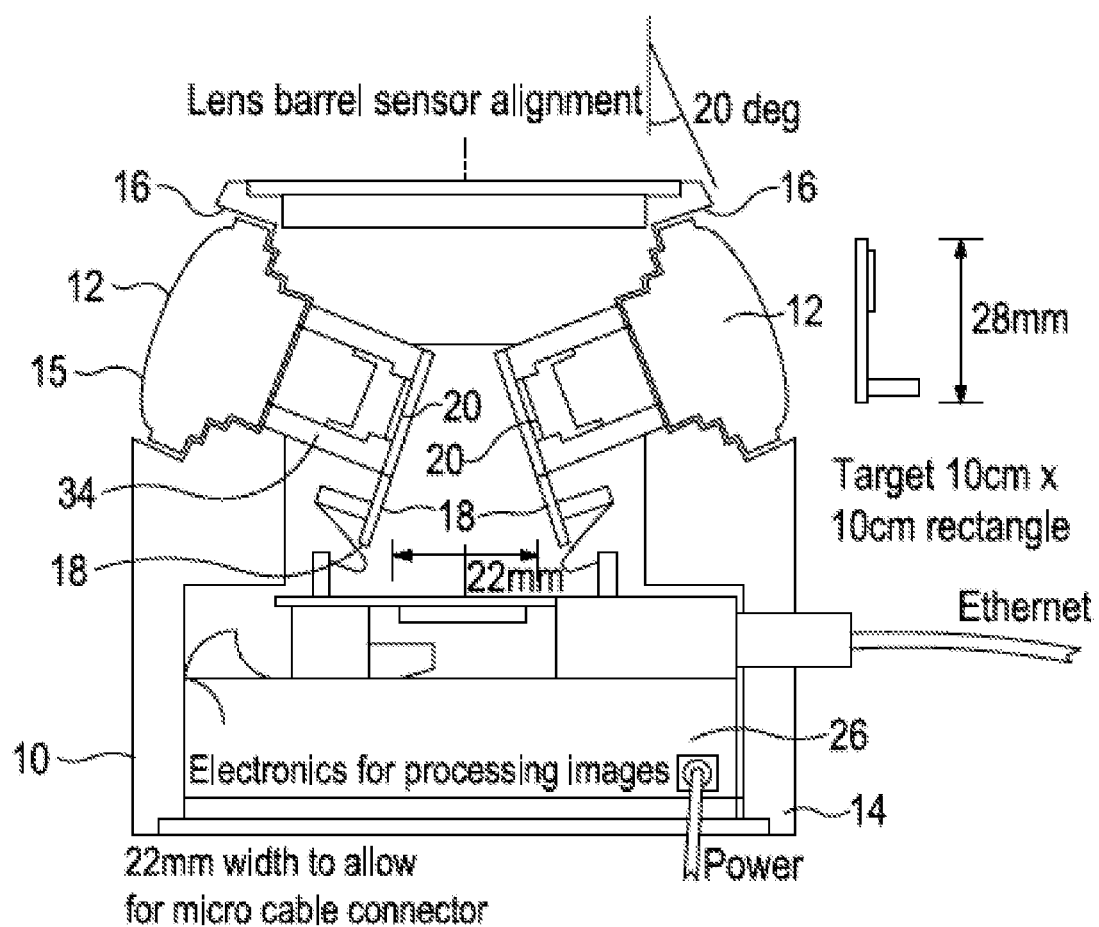
FIG. 3 shows a vertical cross section through the camera of FIG. 1.

FIG. 1 shows a four lens camera 10 for capturing a panoramic image. FIG. 2 shows a horizontal cross sectional view of the camera 10 of FIG. 1 showing the fields of view 11 of each camera. FIG. 3 shows a vertical cross sectional view of the camera 10 of FIG. 1. The camera 10 of FIG. 1 has four imaging systems 15 (only two shown), each positioned on different external sides of a cube shaped housing 14. Each imaging system 15 comprises at least a wide angle lens 12 and a sensor 20 (see FIG. 3) for sensing light from each of the lenses 12. In the particular example shown in FIGS. 1 to 3, each lens 12 is titled at an angle of around twenty degrees relative to the vertical, so that light above the camera 10 can be captured. Using four titled lenses 12 provides a 360×282.3 degree field of view without requiring any further imaging systems 15 to capture light above the camera 10. However, it will be appreciated that at least one or each of the lenses 12 need not be tilted and could instead face directly from the sides of the camera 10 (e.g. such that the imaging axes of the lenses 12 are horizontal) or could be angled in any way that best suits the application for which the camera 10 is to be used.

Each sensor 20 is paired with one of the lenses 12. Each sensor 20 is titled at the same angle, and is centred on the same optical axis, as its paired lens 12. In the example shown in FIGS. 1 to 3, each lens 12 and its associated sensor 20 are tilted by twenty degrees. However, once again, it will be appreciated that one or more or each of the lens 12 and sensor 20 pairs need not be tilted or could be tilted at any angle that best suits the desired field of view for the purpose for which the camera 10 is intended. In practice, the degree of tilt can be defined by the field of view of each lens 12 combined with how much of that view is captured on the sensor area. Sensor 20 and lens 12 pairs on opposite sides of the cube shaped housing 14 are symmetrically arranged in this example, though it will be appreciated that this need not necessarily by the case.

The camera 10 of the invention can be used to capture still or moving, i.e. video, images. The frame rate is defined by the capture rate of the sensors. Ideally, the frame rate would be more than ten frames per second for good resolution video.

The housing 14 is a one-piece housing 14 that has four external recesses 16, each shaped to receive and accurately locate field of view optics, typically the one or more lenses 12. As shown in FIG. 3, the housing 14 also provides a support 18 for the sensors 20. A sensor 20 is mounted on each side of the support 18. Optionally, a mounting barrel 34 is used to locate the lens 12 and sensor 20 relative to each other, thereby to form an integral unit, before insertion into the camera housing 14. This means that the lens 12 and sensor 20 positioning and alignment can be precisely defined prior to insertion into the camera 10, which greatly simplifies assembly. Using a single one-piece housing 14 allows accurate placement of the lenses 12 and sensors 20 in the XYZ planes within a confined space, thereby helping minimise parallax error. In particular, the housing 14 and support 18 hold the imaging systems 15 of the camera 10 at known and accurate relative positions and angles. In this way, geometrical properties of the camera 10 (such the separation and/or relative orientation of the imaging systems 15) are known with a high degree of accuracy.

The housing 14 holds the lenses 12 and all internal workings in place. The housing 14 may be made from any suitable material, for example solid aluminium. By way of an example only, the camera 10 is 10 cm$^3$ and the lens 12 is 5 cm×10 cm. However, it will be appreciated that different sizes and constructions of housing 14 and different lenses and/or sensor 20 arrangements could be used, depending on the intended application or other factors. However, the single piece housing 14 in the present embodiment allows for heat dissipation and provides extremely robust and durable protection against bumps, drops, dust, water and many other harsh environmental in use factors.

By using the lens/sensor alignment barrel 34, each lens 12 can be paired with a sensor 20 prior to insertion into the housing 14. This allows multiple lenses 12 and sensors 20 to be tested and calibrated as a single assembly calibration step to provide accurate live positioning verification prior to final bonding the assembly. This allows the calibration to be done externally of the camera 10, and fine tuning per lens 12 and sensor 20.

The camera 10 includes a configuration file for calibrating the camera 10 as a whole. This is determined using results from all four imaging systems 15. No camera 10 has the same configuration. The configuration file is stored in the camera and used to allow the camera 10 to manipulate image data very quickly. This enables extremely fast output of image data and live video feed.

The camera 10 has at least one tilt sensor (not shown) for sensing its tilt angle. For example, the camera 10 may include a tri-axis tilt sensor, such as an accelerometer, for example the LSM303DLM sensor from ST Microelectronics. This allows the tilt or orientation of the camera 10 relative to the horizontal to be determined. Also included in the camera 10 is image processing software for using the sensed tilt angle to correct image alignment, so that the image presented to the user on screen or saved in the memory is aligned to the horizontal regardless of the orientation of the camera 10.

The tilt information is used by the image processing software in the camera 10 to determine how to stitch the images from each of the lenses together, and how to present the image to the user keeping the horizon of the image relative to the user's view. If tilt sensors are not used and the camera 10 orientation is altered, the user's view will follow the orientation of the camera 10 at that point. Viewing a 360 degree image from the camera 10 of the invention allows a user to look around, above, below, back and forward. This is very confusing if the camera 10 is also moving, causing additional unexpected movement when a user is trying to control the view. Using tilt sensors allows the camera 10 to know which way up it is and its orientation. This information can be used by the image processing software to cancel out changes in the real orientation of the camera 10 from what the user wants to see. This allows a user to experience a stable and predictable view even when the camera 10 is moving in multiple axes.

Each of the wide angle lenses 12 has a maximum, unimpeded field of view 11 of around 180 degrees, but when in situ in the camera 10, each lens 12 has a more limited usable field of view 22. In particular, in the camera 10 of FIG. 1 the usable field of view 22 is in the range of 92 to 110 degrees. This limiting of the field of view 11 of the lenses 12 is advantageous, as the image quality from each lens 12 degrades towards the edges of the field of view 11. This limiting of the field of view 22 can be done in software, i.e. merely by discarding certain data captured and/or by overscanning the sensors 20.

Limiting the usable field of view 22, in this case to just over ninety degrees, means that the best quality parts of the component images are used. This in turn means that the image quality is optimised. This is shown in FIG. 2. Here, the dotted lines show the intrinsic, unimpeded field of view 11 of each lens 12 and the solid lines show the limited, usable field of view 22 from each lens 12. The usable fields of view 22 being slightly over 90 degrees (e.g. between 92 and 110 degrees) is advantageous, and provides overlap regions 23 between the fields of view 22 of adjacent imaging systems 15 for stitching of the component images obtained from each imaging system 15.

Figure 4A:
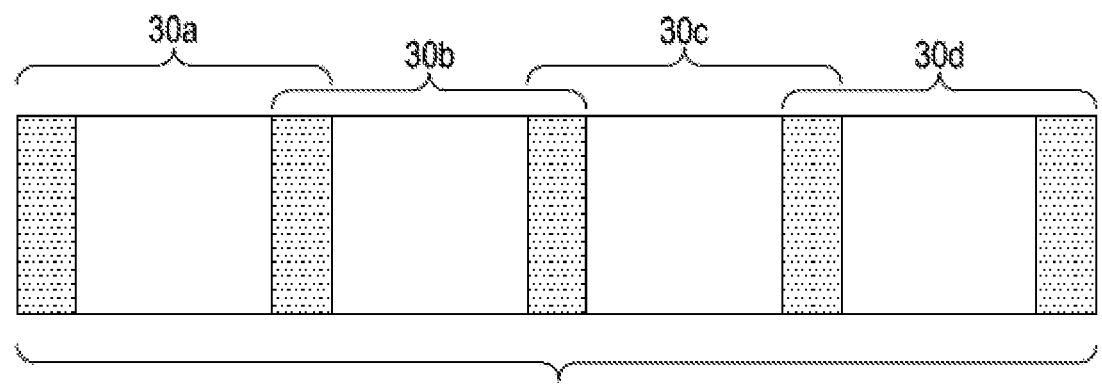
FIG. 4(A) shows an idealized representation of a plurality of component images collected using the camera of FIGS. 1 to 3 that have been composited together to form a composite image.
Figure 4B:
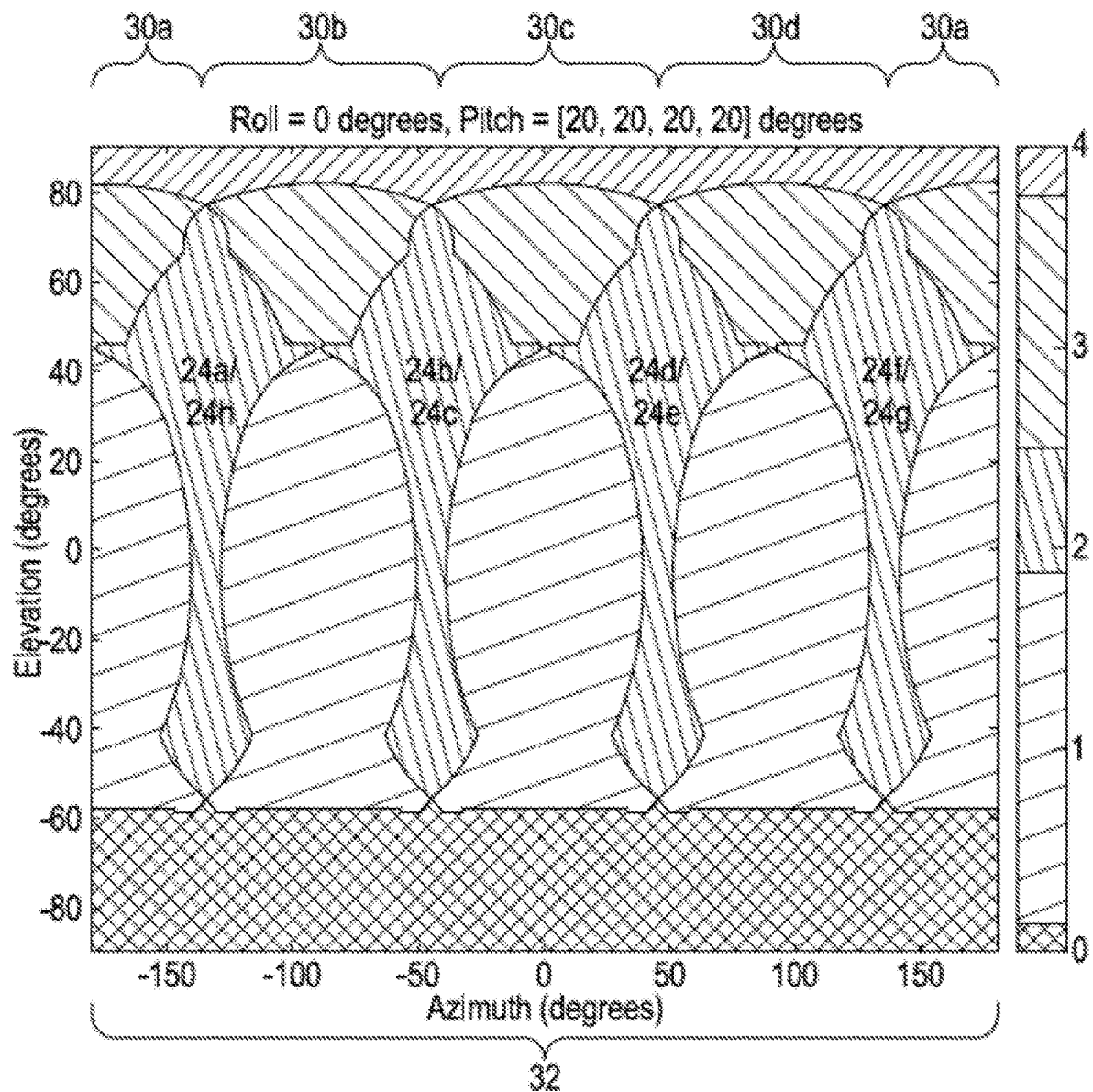
FIG. 4(B) shows a schematic of the overlap between a plurality of component images collected using the camera of FIGS. 1 to 3.

It will be appreciated that the camera 10 of FIGS. 1 to 3 is arranged to simultaneously collect a plurality of component images 30a-30d, as shown as an idealised representation in FIG. 4(A), using the four imaging systems 15, each imaging system 15 being oriented at 90° to each of its neighbours. The component images can form at least part of the visualization data 1040 or can be further processed by the camera 10 and/or the controller 1005 (e.g. stitched together) to form composite images or 3D models, that in turn comprise at least part of the visualization data 1040. As such, the resulting component images 30a-30d collected by the camera 10 represent a field of view 22 from each side of the camera 10. The component images 30a-30d collected by adjacent imaging systems 15 comprise overlapping regions 24a-24h that represent parts of the environment being imaged in an area in which the fields of view of the neighbouring imaging systems overlap (see FIG. 2). Although idealised rectangular overlapping regions 24a-24h are shown in FIG. 4(A) for ease of reference, it will be appreciated that the shape of the overlapping regions 24a-24h is unlikely to be so regular in practice and will vary depending on certain properties of the camera 10 and the environment, such as the tilt angle and field of view of the imaging systems 15, the tilt and field of view of the lenses 12, the sensitivity of the imaging systems 15, the degree of illumination and the like. As such, it is likely that the shape and dimensions of the overlapping regions 24a-24h, e.g. the height and the variation of the width of the overlapping regions 24a-24h with elevation, will vary. FIG. 4(B) shows an actual example of the shape and extent of the overlapping regions 24a-24h of a camera 10 such as that shown in FIGS. 1 to 3, in which the roll angle of each imaging system 15 is zero and the pitch (tilt) angle is 20°. The degree of overlap is indicated by the colour scale on the right. It can be seen from this that the degree of overlap is non-uniform, with the degree of overlap varying with elevation and azimuth. However, as indicated above, it will be appreciated that the overlapping regions 24a-24h will vary as the camera or environment changes, e.g. with varying roll or pitch angle at which the imaging systems 15 are angled, and the like.

Although the above example uses a camera 10 advantageously having four imaging systems where the component images 30a-30d are collected simultaneously, it will be appreciated that the above method is equally applicable to other cameras having different numbers of imaging systems and/or where the component images 30a-30d are not collected simultaneously.

Indeed, the method is also applicable to a camera 10 having one or more imaging systems 15, wherein at least some or all of the component images 30a-30d are taken sequentially or non-concurrently. For example the one or more imaging systems 15 could be rotated or otherwise moved and used to collect a series of non-concurrent or sequential component images 30a-30d at different positions or rotational positions of the one or more imaging systems 15. In this case, rather than relying on the known geometry and relative positions and orientations of the imaging systems 15 of the camera 10, the position and/or orientation of the one or more imaging systems 15 when the respective component images 30a-30d are collected can be determined, e.g. based on known movement of the one or more imaging systems 15 (e.g. by using an accurate stepper motor or the like) and/or by using sensors such as: rotation sensors; angle encoders; accelerometers; RFID, wireless, Bluetooth or other tag or triangulation systems; GPS, GLONASS, GALILEO or other positioning systems or sensors; and/or any other suitable locating sensor known in the art.

Figure 6:
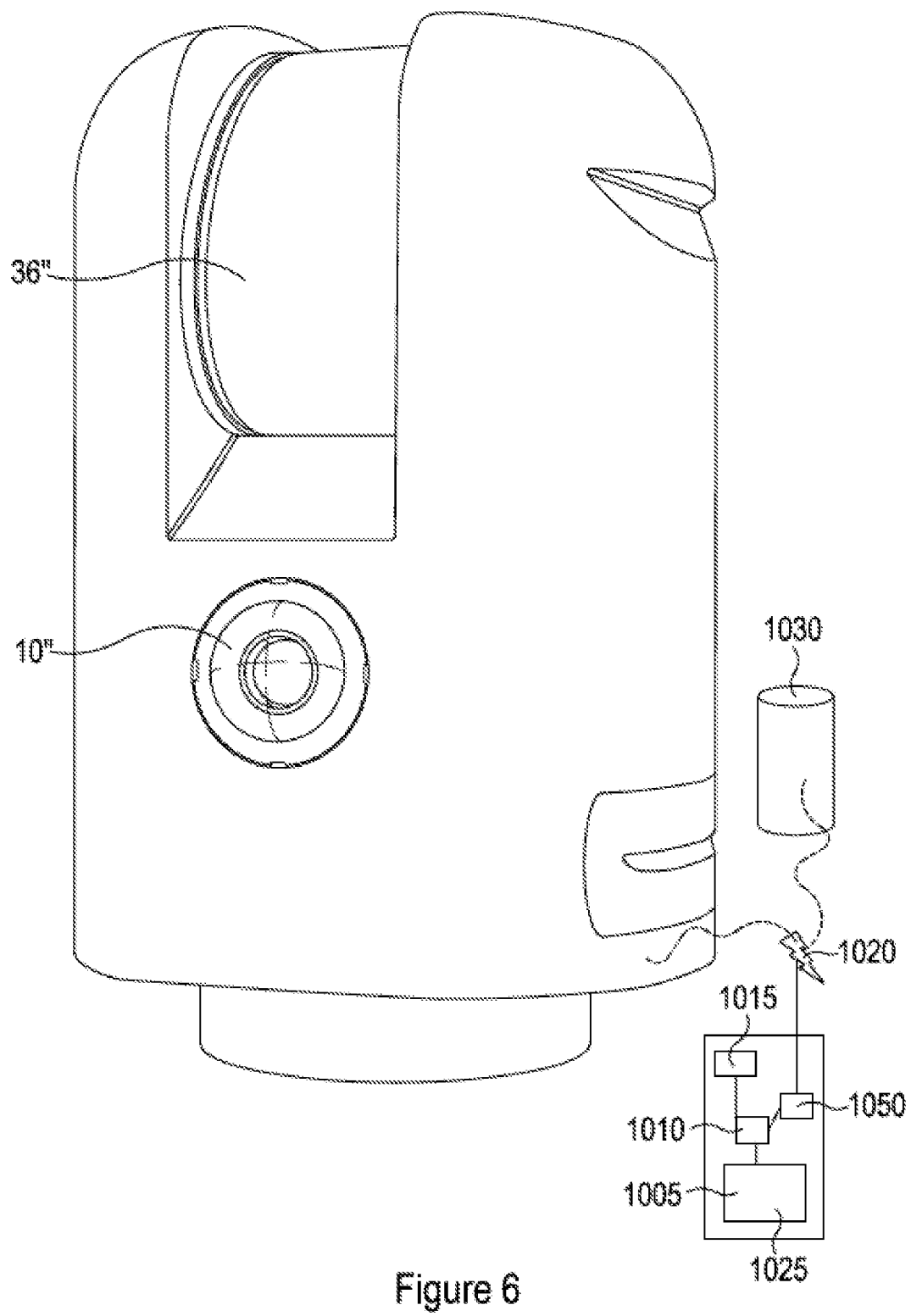
FIG. 6 shows an alternative system comprising single lens camera that also comprises a laser scanner, a controller and a server.

Another example of a camera 10" that could be used in the present invention is shown in FIG. 6, in which the camera 10' is used with a laser scanner 36" to provide an image of an environment being scanned. One or more imaging systems 15 of the camera 10" are used to collect the component images 30*a*-30*d* and the laser scanner 36" provides depth or range information.

Laser scanners 36 are used to capture detailed and accurate position information of scenes of interest. Laser scanners 36 have a laser that sends highly directional beams of light to a scene and a detector for receiving light reflected back. The laser is rotated in use so that a wide field of view of a scene can be captured (in most cases the desired field of view is 360 degrees). Laser scanners 36 are commonly used by architects and structural engineers for imaging complex buildings, where highly accurate position information is needed. Typically, the data captured by the laser scanner 36 is presented as three dimensional line drawings.

Although stitching the component images 30*a*-30*d* together to form a composite image is described, it will be appreciated that the above techniques can also be used to form a 3D model that is coloured or skinned using the component images 30*a*-30*d*. The 3D model can then be used to provide panoramic and/or 360° images from any view point within the model. For example the depth information can be used to create a model structure or skeleton. The component images 30*a*-30*d* can then be used to colour or skin the associated parts of the model. It will be appreciated that, in this case, the component images may but need not be stitched together to form a composite image before doing so. It will be appreciated that stitching is referred to above as a specific form of combining.

In embodiments, the camera and controller (e.g. the mobile app operating on a network enabled device) communicate with cloud servers to poll the current data capture requirement and cross reference it with the current camera or vehicle position. Roads, locations or areas that have been flagged as 'required' will automatically be recorded. Roads, locations or areas that have been recently captured, have a high level of visualization data or are of little interest or the like, may be flagged as 'not required' and will not be recorded. The controller (e.g. the mobile app) optionally also provides a highlighted route plan to show the user the current 'roads required' on a map or sat nay. The route optionally plots the most efficient capture route between destinations or highlight 'priority roads' to capture.

The arrangements described above provide several benefits. For example, a camera that's expected to record continuously for a period of time, e.g. 4 hours, may therefore only record for less than the expected period of time, e.g. 1 hour of 'required data'. This may reduce the storage and/or data communication requirements for storing and/or transmitting the visualization data collected and determined by the camera/controller. The camera and controller may proactively use the non-capture time saved, e.g. the 3 hours of non-capture, to stitch and process the data on board the camera and/or controller.

One potential benefit is to increase or maximize efficiency of the capture process, for example, 4 hours of driving may equate to 1 hour of 'required data' captured and processed. Another potential benefit is that it may be possible to achieve no or little post processing time before upload (which could otherwise result in delays of hours prior to upload). Another potential benefit is that it may be possible to reduce upload time and/or less bandwidth may be required to upload and/or publish (e.g. using a for Publish-to-Street-View API or other interface to a visualization data service provider's server). Another potential benefit is that it may be possible to selectively push high value data to the server. The controller may support a range of image formats and metadata such as.jpg and xmp metadata. The third party of visualization data service provider may have control over all captured content and frequency of refresh data, before data is pushed up to servers. In this way, the system may effectively allow a plurality of users collecting visualization data to be controlled or guided by the visualization data service provider through the provision of the priority or value data from the visualization data service provider to the user's individual controllers and/or cameras.

As such, a skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:

1. A processing system for a camera configured to collect visualization data comprising a plurality of images to be composited together to form composite images or three-dimensional (3D) models, the processing system at least one of comprising or being configured to access a data store that stores priority or value data, the priority or value data indicating respective priorities or values of each of a plurality of roads, locations, regions, or areas, wherein:
the processing system is configured to:
determine or identify a location;
pre-determine or pre-assign the priority or value for the determined or identified location from the priority or value data, the priority or value representing a level of requirement for the visualization data for the composite images or 3D models; and
subsequent to the pre-determining or pre-assigning of the priority or value for the determined or identified location, at least one of:
prior to collection of visualization data using the camera, cause a display to show a representation of the predetermined or pre-assigned priority or value data of the associated one or more roads, locations, regions or areas; or
control the camera to selectively operate to collect visualization data based on the predetermined or pre-assigned priority or value data and the determined or identified location, wherein the determined or identified location is the current location of the camera and/or processing system.

2. The processing system according to claim 1, wherein the camera is a panoramic camera.

3. The processing system according to claim 1, wherein the processing system is further configured to:
determine a road, location, region or area from the plurality of roads, locations, regions or areas stored in the data store that either matches, corresponds to, or is closest to the determined or identified location; and
determine the priority or value for the determined or identified location from the priority or value for the matching, corresponding or closest road, location, region or area stored in the data store.

4. The processing system according to claim 1, wherein the priority or value data is at least partially or wholly based on, or indicative of, one or more or each of:
an extent or degree of coverage of visualization data for the road, location, region or area;
the date or age of visualization data for the road, location, region or area;
the quality of visualization data for the road, location, region or area; and/or the value or interest in visualization data for the road, location, region or area.

5. The processing system according to claim 1, wherein the processing system further comprises or is configured to access a position determination system for determining the location of the camera and/or processing system and the location determined or identified by the processing system comprises a current location of the camera and/or processing system determined using the position determination system.

6. The processing system according to claim 1, wherein the processing system comprises, is configured to communicate with, or is configured to operate, a display and generate and/or cause the display to show a representation of the priority or value data of the associated one or more roads, locations, regions or areas.

7. The processing system according to claim 6, wherein:
the representation of the priority or value data is or comprises a map showing priority or value scores for the associated one or more roads, locations, regions or areas; and/or
the representation of the priority or value data is or comprises a table showing priority or value scores for the associated one or more roads, locations, regions or areas ordered by proximity, by value or by priority.

8. The processing system according to claim 6, wherein the representation of the priority or value data highlights locations, roads or areas of that have a priority or value score above a high priority threshold.

9. The processing system according to claim 1, wherein the processing system is further configured to determine a route and/or display a route on the display, wherein the route is based on the priority or value data such that the route maximizes or optimizes the priority or value of the roads, locations, regions or areas through which the route passes.

10. The processing system according to claim 9, wherein the route is:
the most efficient route between the current location and a destination; and/or
the most efficient route for an available time period.

11. The processing system according to claim 1, wherein the processing system is further configured to control the camera to operate based on the priority or value data and the determined or identified location, wherein the determined or identified location is the current location of the camera and/or processing system.

12. The processing system of claim 11, wherein the processing system is further configured to at least one of:
control the camera to selectively collect visualization data and/or to increase the rate or amount of visualization data collected when the priority or value score associated with the determined or identified current location of the camera and/or processing system is higher than a threshold;
control the camera to not collect visualization data and/or to decrease the rate or amount of visualization data collected when the priority or value score associated with the determined or identified current location of the camera and/or processing system is lower than or below a threshold; or
receive a required priority required by a third party or mapping or visualization data service provider, and the processing system is configured to control the camera to selectively collect visualization data and/or to increase the rate or amount of collection of visualization data when the priority or value score associated with the determined or identified current location of the camera and/or processing system is the required priority or value.

13. The processing system according to claim 12, wherein:
the processing system is further configured to process collected visualization data by combining or stitching one or more images and/or depth data collected by the camera to form composite images and/or 3D model data; and
the processing system selectively processes the visualization data and/or varies the rate or amount of processing of the visualization data based on the priority or value data and the determined or identified current location of the camera and/or processing system by either:
selectively performing processing or increasing the amount of processing carried out when the priority or value of the present location of the camera and/or processing system is below a threshold than when the priority or value of the present location of the camera and/or processing system is high or above a threshold; or
selectively performing processing or increasing the amount of processing carried out when the priority or value of the present location of the camera and/or processing system is above a than when the priority or value of the present location of the camera and/or processing system is low or below a threshold.

14. A mobile and/or network enabled device, comprising or configured to implement the processing system of claim 1, the device comprising at least one processor, memory and/or other data storage and a wireless and/or wired communications module, wherein the device comprises or is configured to communicate with a camera and/or a remote server or data store via the communications module.

15. A system comprising:
a camera configured to collect visualization data comprising a plurality of images to be composited together to form composite images or three-dimensional (3D) models;
a display; and
the processing device of claim 1,
wherein:
the camera is linked to or in communication with the processing device; and
the system is configured to:
provide, for the location determined or identified by the processing system, the pre-determined or pre-assigned priority or value representing a level of requirement for the visualization data to be collected by the camera for the composite images or 3D models;
subsequent to the predetermining or pre-assigning of the priority or value for the determined or identified location, at least one of:
prior to collection of the visualization data using the camera, cause the display to show a representation of the predetermined or pre-assigned priority or value data of the associated one or more roads, locations, regions or areas; or
control the camera to selectively operate to collect the visualization data based on the predetermined or pre-assigned priority or value data and the determined or identified location, wherein the determined or identified location is the current location of the camera and/or processing system.

16. A vehicle comprising the system of claim 15, wherein the processing system and the camera are comprised in or mounted on the vehicle.

17. The vehicle according to claim 16, wherein the vehicle is one of: a remotely controlled or autonomous or semi-autonomous vehicle, a drone, an at least partly self-driving car or other vehicle, or a robot.

18. A method of using the processing system of claim 1 to control a camera to collect visualization data for incorporating into composite images or three-dimensional (3D) models or to display a priority or value representing a level of requirement for the visualization data to be collected by the camera for incorporating into composite images or 3D models or a visualization based thereon, the method comprising:
   accessing priority or value data;
   determining or identifying a location;
   pre-determining or pre-assigning the priority or value data or datum that is associated with a road, location, region or area that matches, corresponds or is closest to the determined or identified location;
   determining the priority or value for the determined or identified location from the determined priority or value data or datum; the priority or value representing a level of requirement for the visualization data for the composite images or 3D models; and
   subsequent to the pre-determining or pre-assigning of the priority or value for the determined or identified location, at least one of:
      prior to collection of the visualization data using the camera, displaying on the display a representation of the pre-determined or pre-assigned priority or value data for the determined or identified location; or
      controlling the camera to selectively operate to collect the visualization data at the determined or identified location according to the pre-determined or pre-assigned priority or value data for that location, the determined or identified location being the current location of the camera and/or processing system.

19. A non-transitory computer readable storage medium for implementing the method of claim 18 when installed or provided in a suitable controller or processing apparatus.

20. The processing system of claim 1, wherein the visualization data collected by the camera comprises a plurality of images to be composited together to form composite images or 3D models, and the priority or value represents a level of requirement for the visualization data for the composite images or 3D models.

* * * * *